UNITED STATES PATENT OFFICE.

EDMUND JAMES MILLS, OF GLASGOW, SCOTLAND

PROCESS OF PRODUCING SOLUBLE COLLOIDS.

SPECIFICATION forming part of Letters Patent No. 580,323, dated April 6, 1897.

Application filed November 7, 1896. Serial No. 611,401. (No specimens.)

*To all whom it may concern:*

Be it known that I, EDMUND JAMES MILLS, a subject of the Queen of Great Britain and Ireland, and a resident of Glasgow, Scotland, have invented certain Improvements in the Formation and Preparation of Soluble Colloids of the Gelatin Class, of which the following is a specification.

My said invention comprises modifications of or improvements on the process described in my patent specification, No. 569,112, dated October 6, 1896, for converting gelatin or a gelatin-containing or gelatinous substance into a compound soluble in cold water.

By my present invention I obtain the same result at the ordinary temperature without the aid of heat specially applied in the converting process. I take, for example, one hundred parts of glue, preferably comminuted, five parts of slaked lime, and one hundred parts of water. These I stir well together and allow to remain in an apartment not specially heated until a colloid is formed which is perfectly soluble in cold water. The time required depends on the quality of the glue, on its degree of comminution, and on the prevailing temperature. With glue of good quality and moderate hardness the conversion takes place in a week or ten days.

Or the process may be varied by taking glue which has been dissolved in water with the aid of heat, the solution having been allowed to cool until it has reached the ordinary temperature and become a jelly. I comminute the jelly in any convenient way, as, for example, by pressing through wire-gauze, squirting, or stirring, and I then stir into it the slaked lime, mixing thoroughly. In the course of an hour or more, the time depending on the quality of the glue and on the prevailing temperature, perfect liquefaction will have been attained.

Instead of caustic lime other caustic alkaline earths may be employed, and also caustic alkalies and their carbonates may be used, if desired; also, the proportions of the substances may be varied to some extent from those hereinbefore mentioned.

What I claim as my invention is—

The process of preparing from gelatin or a gelatin-containing or gelatinous substance, a colloid soluble in cold water, by treating the same either dry or as a jelly in a comminuted state, with an alkaline substance cold substantially as hereinbefore described.

In testimony whereof I have signed my name to this specification in the presence of two subscribing witnesses.

EDMUND JAMES MILLS.

Witnesses:
DAVID FERGUSON,
GEORGE PATTERSON.